US009143357B2

(12) United States Patent
Ochi et al.

(10) Patent No.: US 9,143,357 B2
(45) Date of Patent: Sep. 22, 2015

(54) CHAT APPARATUS TRANSMITTING/RECEIVING INFORMATION INDICATING SWITCHING OF CHAT

(75) Inventors: Ryouichi Ochi, Kanagawa (JP); Hidehiko Fujiwara, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 2309 days.

(21) Appl. No.: 11/090,222

(22) Filed: Mar. 28, 2005

(65) Prior Publication Data

US 2005/0223059 A1    Oct. 6, 2005

(30) Foreign Application Priority Data

Mar. 31, 2004   (JP) ................. 2004-105431

(51) Int. Cl.
 G06F 15/16 (2006.01)
 H04L 12/58 (2006.01)
 H04L 12/18 (2006.01)
 G06F 15/173 (2006.01)

(52) U.S. Cl.
 CPC .......... *H04L 12/581* (2013.01); *H04L 12/1813* (2013.01); *H04L 51/04* (2013.01)

(58) Field of Classification Search
 None
 See application file for complete search history.

(56) References Cited

U.S. PATENT DOCUMENTS

| | | | | | |
|---|---|---|---|---|---|
| 5,491,743 | A | * | 2/1996 | Shiio et al. | 709/204 |
| 2003/0037110 | A1 | * | 2/2003 | Yamamoto | 709/204 |
| 2003/0131064 | A1 | * | 7/2003 | Bell et al. | 709/206 |
| 2003/0135569 | A1 | * | 7/2003 | Khakoo et al. | 709/206 |
| 2003/0154250 | A1 | * | 8/2003 | Miyashita | 709/204 |
| 2004/0186889 | A1 | * | 9/2004 | Washburn | 709/206 |
| 2004/0198403 | A1 | * | 10/2004 | Pedersen et al. | 455/517 |
| 2007/0027900 | A1 | * | 2/2007 | Toyoda et al. | 707/102 |

FOREIGN PATENT DOCUMENTS

| | | | |
|---|---|---|---|
| JP | 05-336288 | 12/1993 | |
| JP | 2000-183998 | 6/2000 | ............ H04L 29/06 |
| JP | 2001-202315 | 7/2001 | |
| JP | 2001-222498 | 8/2001 | |

(Continued)

OTHER PUBLICATIONS

Reed, D et al. RFC 1459—Internet Relay Chat Protocol, Publsihed May 1993.*

(Continued)

*Primary Examiner* — Joseph Greene
(74) *Attorney, Agent, or Firm* — Whitham Curtis Christofferson & Cook, PC

(57) ABSTRACT

A chat system comprises editor 1 which includes an input area for chatting and an output area where chat conversation is written; information converter 2 which is capable of reading an inputted character string written into the editor 1 and detecting a specific input, and outputting an input to an input area in the editor 1, and reads a character string existing in the editor 1, converts the character string to a code and add to control information for a chat; transmitter 3 which transmits information outputted from the information converter 2 to a chat communication partner; receiver 4 which receives information sent from the chat partner; and information analyzer/converter 5 which analyzes and converts a code to a character string, outputs the character string onto the output area in the editor 1, and performs an operation in accordance with the control information.

9 Claims, 7 Drawing Sheets

(56) References Cited

FOREIGN PATENT DOCUMENTS

| | | | | |
|---|---|---|---|---|
| JP | 2001-325236 | | 11/2001 | |
| JP | 2002-032305 | * | 1/2002 | .............. G06F 13/00 |
| JP | 2002-063124 | | 2/2002 | |
| JP | 2002-169764 | | 6/2002 | .............. G06F 13/00 |
| JP | 2002-288102 | | 10/2002 | |
| JP | 2003-114858 | | 4/2003 | |

OTHER PUBLICATIONS

Reed et al., RFC 1459: Internet Relay Chat Protocol, 1993.*
The Office Action issued by the japanese Patent Office on Aug. 7, 2007, with English language translation, pp. 1 to 5.
Japanese Office Action with English Translations.

* cited by examiner

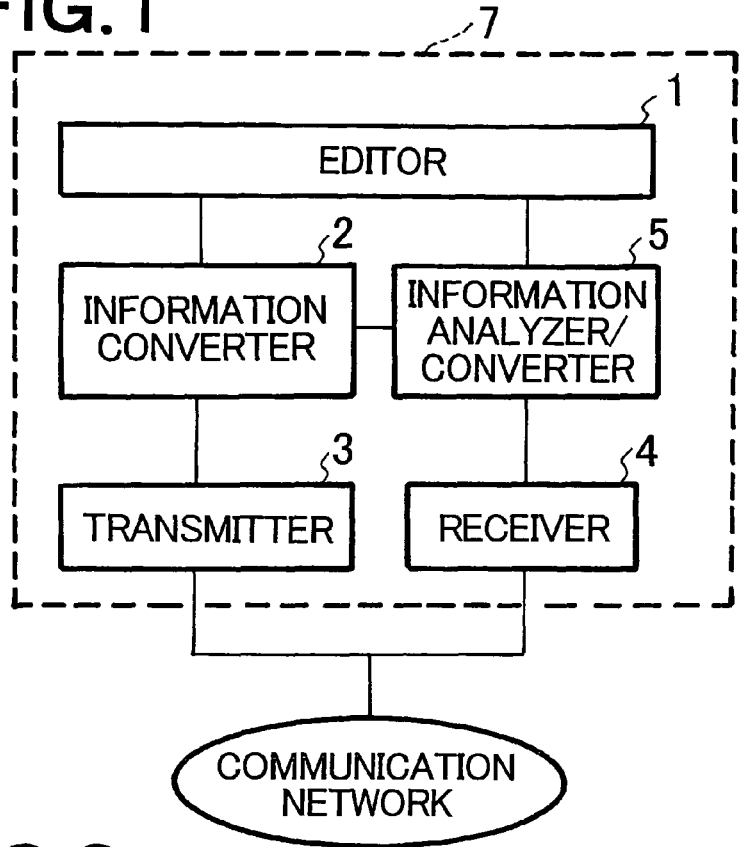
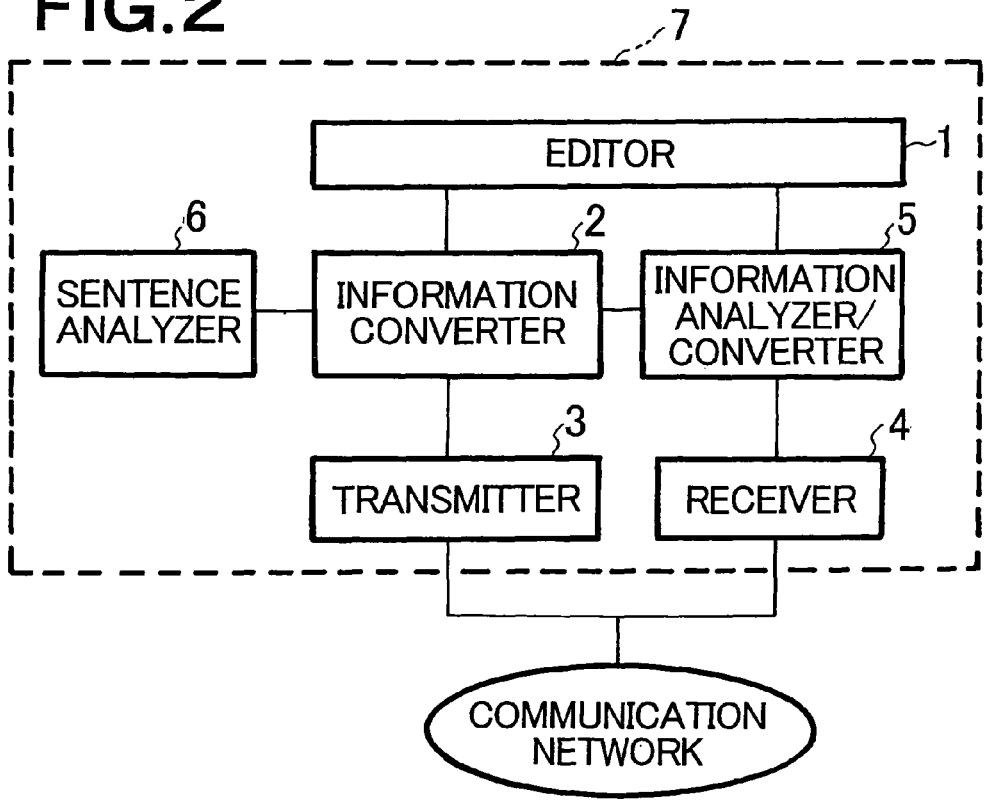

FIG. 7

| CODE | CHARACTER STRING |
|---|---|
| * | I AM VERY GLAD TO EXCHANGE MAIL WITH YOU |
| # | I AM VERY GLAD TO HEAR FROM YOU SOON |
| + | THANK YOU FOR YOUR MAIL |
| ! | HAVE A NICE DAY |

CHAT APPARATUS TRANSMITTING/RECEIVING INFORMATION INDICATING SWITCHING OF CHAT

BACKGROUND OF THE INVENTION

1. Field of the Invention

The present invention relates to a chat apparatus, a server, chat method and program product for chat and particularly, to a chat apparatus and server which can provide relaxed conversation, a chat method and a program product for chat therefor.

2. Description of Related Art

On conventional personal-computer communications, chat systems have been providing services which allow participants to make real-time conversation with each other.

In a chat system, plural participants can simultaneously talk to each other, and a message from one participant is monitored by every one of the participants.

JPA 2001-202315 discloses one of techniques concerning conventional chat systems. According to this technique, a conversation device enables mutual transmission/reception and display of text messages, sharing a virtual space connected to and established on a network. This conversation device has an input/output table, a reaction means, and a display means. The table stores predetermined reactions, predetermined input operations for specifying the predetermined reactions and predetermined symbols expressing the reactions so that the reactions, input operations and symbols are linked to each other. The reaction means notifies the reactions corresponding to the input operation, to other conversation devices in the virtual space by using the conversation device. The display means displays the symbols transmitted from other conversation devices, independently from text messages.

JPA 2002-063124 discloses a chat system capable of establishing a network and of mutually transmitting/receiving messages through any of plural virtual spaces prepared on the network. The chat system includes plural terminals each having a display means which displays the transmitted/received messages together with communicator identification information, and a table means which stores identifiers of communicators which use the vertical communication spaces, and character string information items respectively corresponding to the identifiers. The character strings are used as the communicator identification information items.

JPA 2002-288102 discloses a communication terminal which a user uses to participate in a chart service as an electronic communication service which allows plural users to exchange messages on a network. The communication terminal has an input means for inputting message data from the user, a communication means connected to a network and for receiving message data from other users, and a display means which displays, as plural message data, the message data inputted through the input means from the user and the message data received by the communication means from the other users. The display means has a data processing means which processes message data so that the order of given message data of at least part of the plural message data is displayed clearly.

JPA 2003-114858 discloses a message chat system configured by connecting a client device and a message chat information processing device to be communicable with each other via a network. The client device is for a user who conducts virtual dialogue. The message chat information processing device processes information concerning a virtual dialogue conducted by the client device. The client device has a terminal dialogue control means which receives an input requesting start of a virtual dialogue from outside of the client device and transmits this virtual dialogue start request to the message chat information processing device via the network. The message chat information processing device has a dialogue partner determination means which determines a dialogue partner in a predetermined determination method upon reception of the dialog start request by the message chat information processing device, and a dialogue request means which transmits a dialogue start request to another client device of the dialogue partner determined by the dialogue partner determination means via the network. Upon reception of the dialog start request, the terminal dialogue control means of the client device controls a predetermined output means to display a predetermined dialogue screen and also controls chatting through the dialogue screen.

However, in the conventional techniques in the prior art as described above, conversation of only those chat participants who input characters at higher speeds is adopted if there are differences in key input speed among chat participants. It is therefore difficult for slow typists (or who input characters at lower speeds) to join chatting.

Even when it is desirable to hear opinions from all chat participants, it is difficult to collect messages from all the chat participants.

In addition, in the chat system, the real-time advantage is considered significant. Therefore, coding of transmission sentences that extra processing time is needed is difficult.

SUMMARY OF THE INVENTION

An object of the present invention is to provide a chat apparatus by which chat participants can feel easy to join chatting regardless of key input speeds.

Another object of the present invention is to provide a chat apparatus which can encode transmission sentences with ease.

To achieve the objects described above, according to a first aspect of the present invention, there is provided a chat apparatus comprising: an information output portion which outputs an inputted first character string, and first control information added when chat switches (changes), the first control information indicating switching (changing) of a chat; a transmitter which transmits the first character string and first control information to a partner of the chat; a receiver which receives information sent from the partner of the chat; and an information analyzing/operating portion which analyzes the received information, and performs chat switching operation (chat changing operation) when second control information is included, the second control information indicating switching (changing) of a chat.

According to a second aspect of the present invention, there is provided a chat apparatus comprising: an information converter which detects an inputted first specific character string, converts the inputted first specific character string to a character string shorter than the first specific character string or to a code, and outputs first information including the character string or code and first control information added when chat switches, the first control information indicating switching of a chat; a transmitter which transmits the first information and first control information to a partner of the chat; a receiver which receives, from the partner of the chat, second information including a character string or code and second control information added when the chat switches, the character string or code being produced by converting a second specific character string, the character string being shorter than the second specific character string, and the second control information indicating switching of a chat; and a information analyzing/operating portion which analyzes the received second information and converts, the character string or code to the second specific character string, and performs chat switching operation when the second control information is included in the second information.

According to a third aspect of the present invention, there is provided a server comprising: a information analyzing/operating portion which receives information transmitted from a chat terminal, analyzes the received information, ignores information later transmitted from the chat terminal when control information is included and receives information transmitted from a switched other chat terminal, the control information indicating switching of a chat; and a recording portion which records a character string included in information received by said information analyzing/operating portion; wherein said information analyzing/operating portion transmits the character string recorded on said recording portion to a chat terminal other than said switched other chat terminal.

According to a fourth aspect of the present invention, there is provided a chat method comprising the steps of: transmitting to a partner of chat an inputted first character string and first control information added when the chat switches, the first control information indicating switching of the chat; receiving information sent from the partner of the chat and analyzing the received information; and performing chat switching operation when second control information is included in the information, the second control information indicating switching of the chat.

According to a fifth aspect of the present invention, there is provided a chat method comprising the steps of: receiving information transmitted from a chat terminal; analyzing the received information, ignoring information later transmitted from the chat terminal when control information is included, and receiving information transmitted from a switched other chat terminal, the control information indicating switching of a chat; recording a character string included in received information; and transmitting the recorded character string to a chat terminal other than said switched other chat terminal.

According to a sixth aspect of the present invention, there is provided a program product embodied on a storage portion of a computer connected to a partner of a chat through a network and comprising code that, when said program product is executed, cause said computer to perform a chat method comprising the steps of: transmitting to the partner of chat an inputted first character string and first control information added when the chat switches, the first control information indicating switching of the chat; receiving information sent from the partner of the chat and analyzing the received information; and performing chat switching operation when second control information is included in the information, the second control information indicating switching of the chat.

According to a seventh aspect of the present invention, there is provided a program product embodied on a storage portion of a computer connected to a chat terminal through a network and comprising code that, when said program product is executed, cause said computer to perform a chat method comprising the steps of: receiving information transmitted from a chat terminal; analyzing the received information, ignoring information later transmitted from the chat terminal when control information is included, and receiving information transmitted from a switched other chat terminal, the control information indicating switching of a chat; recording a character string included in received information; and transmitting the recorded character string to a chat terminal other than said switched other chat terminal.

According to the present invention, after a chat participant once completes inputting, the same chat participant cannot further keep on inputting without waiting for a response from any other chat participant. Therefore, participants can input their own messages after thinking thoroughly in a relaxed mood. Thus, participants are prevented from being left out of the conversation.

According to the present invention, words which are frequently used in chats are converted by use of special codes in the course of encryption. Therefore, the communication volume at the time of exchanging regular dialogues can be reduced.

According to the present invention, common coding information which is arbitrarily set are shared and used by both of partners chatting with each other. Therefore, frequently used words and particular phrases can be communicated, with small data amounts. Accordingly, duration of communication can be shortened much more.

According to the present invention, frequently used words and phrases during a chat can be replaced with codes. Therefore, the communication speed and volume can be improved.

According to the present invention, it is possible to provide a chat in which participants can input a message at their desirable timing.

BRIEF DESCRIPTION OF THE DRAWINGS

FIG. 1 is a block diagram showing a configuration of an embodiment of the present invention;

FIG. 2 is a block diagram showing a configuration of an embodiment of the present invention;

FIG. 7 is a diagram showing a sample of the correspondence table of codes; and

DETAILED DESCRIPTION OF THE PREFERRED EMBODIMENTS

Figure 3:
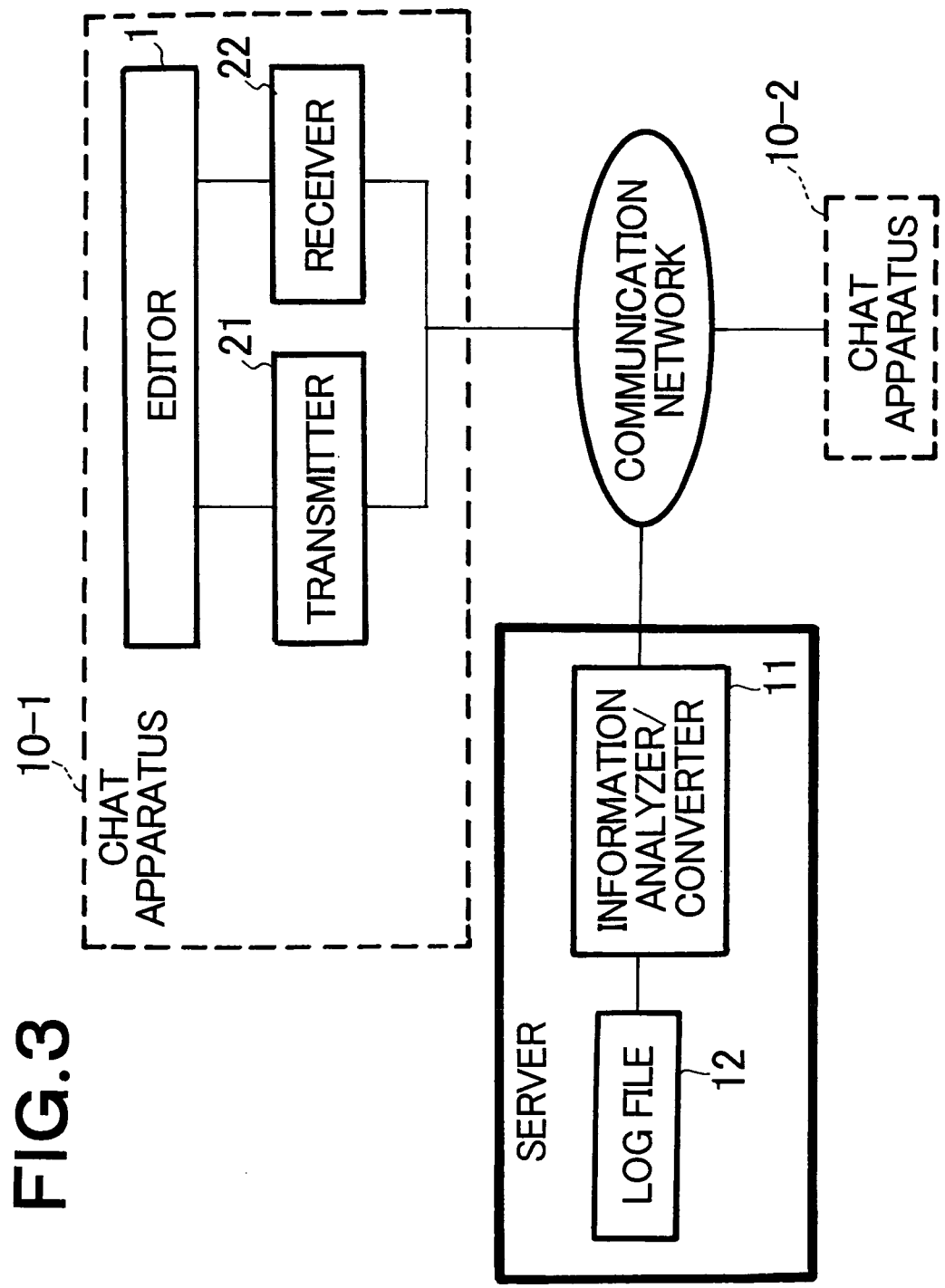
FIG. 3 is a block diagram showing a configuration of an embodiment of the present invention.

Embodiments of the present invention will be described below with reference to the drawings.
[Description of the Structure]
FIG. 1 is a block diagram showing an exemplar configuration in which a chat apparatus according to the first embodiment of the present invention is connected to a communication network.

A chat apparatus 7 according to the present embodiment contains editor 1, information converter 2 which functions as an information out portion, transmitter 3, receiver 4, and information analyzer and converter (information analyzer/converter) 5 which functions as an information analyzing/operating portion.

The editor 1 includes an input area for displaying input information from the information converter 2 and editing the input information on the basis of the display image, and an output area where chat conversation (or dialogues) between chat participants is written. The editor 1 has a function to input/output characters.

The information converter 2 has a function to output the input information inputted by input device, such as a key board, to the input area in the editor 1, and a function to convert the character string inputted on the editor 1 together with control information into a format usable for communication and output to the transmitter 3.

The transmitter 3 has a function to transmit information outputted from the information converter 2 to a chat communication participant via a network.

The receiver 4 has a function to receive information sent from the chat communication participant and send the information to the information analyzer/converter 5.

The information analyzer/converter 5 has a function to analyze and convert information which is sent from the receiver 4 of the chat communication participant and converted by the information converter 2 of the chat communication participant, output a character string onto the output area in the editor 1, and perform an operation in accordance with control information.

In the embodiment, an input is first sent to the information converter 2. The input may be first sent to the editor 1.

[Description of the Operation]

As a preparation, it is necessary that the configuration shown in FIG. 1 be prepared together with two communication participants (hereinafter referred to as participant A and participant B) who are communicable with each other via a network. Here, in the participant A side, it is assumed that editor 1-A, information converter 2-A, transmitter 3-A, receiver 4-A and information analyzer/converter 5-A is provided. Further, in the participant B side, it is assumed that editor 1-B, information converter 2-B, transmitter 3-B, receiver 4-B and information analyzer/converter 5-B is provided.

Figure 5:
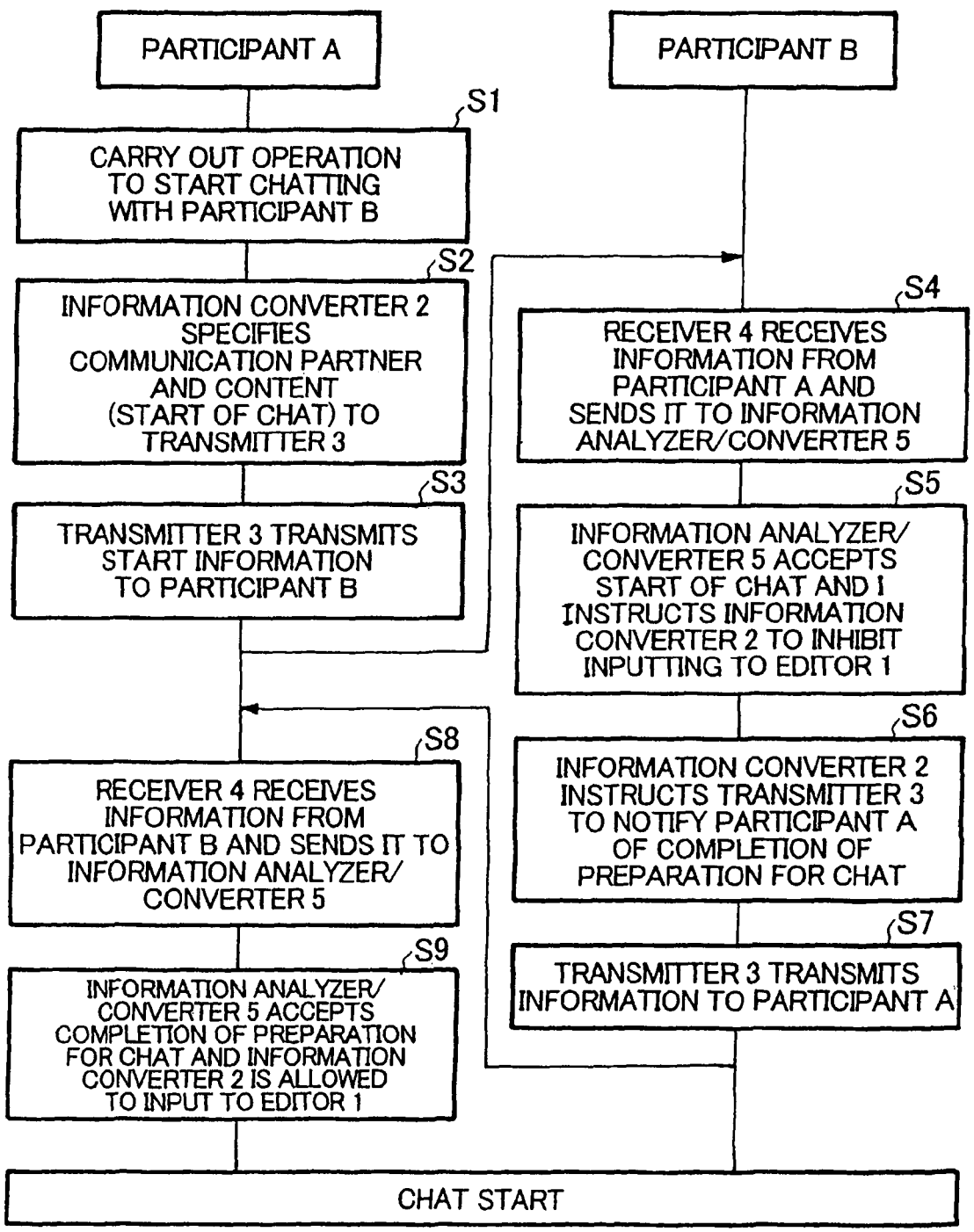
FIG. 5 is a flow diagram showing an operation of an embodiment of the present invention.

With reference now to FIGS. 1 and 5, the communication participant A carries out an operation to start a chat with participant B (step Si). The information converter 2-A then specifies start information as information which includes a communication participant and a communication content (i.e., start of a chat), to the transmitter 3-A (step S2). The transmitter 3-A sends the start information to participant B (step S3). The receiver 4-B receives the start information and then sends the start information to the information analyzer/converter 5-B (step S4).

The information analyzer/converter 5-B stops inputs from the input device of participant B side from being reflected on the input area in the editor 1-B, thereby to stop receiving inputs from the input device of participant B side (step S5). That is, while the participant A is carrying out an input operation, the participant B cannot input anything.

Upon completion of setting flags in the editor 1-B, the information converter 2-B specifies, to the transmitter 3-B, that the editor 1-B has been prepared for chatting (step S6). The transmitter 3-B transmits information indicative of complete preparation for chatting, to the receiver 4-A (step S7).

The receiver 4-A receives the information indicative of complete preparation for chatting, from the participant B side (step S8) and then outputs the information to the information analyzer/converter 5-A.

Upon reception of the transmitted information indicative of complete preparation in the participant B side from the receiver 4-A, the information analyzer/converter 5-A gives a notification to let the information converter 2-A start outputting to the editor 1-A. The preparation for chatting is thereby complete in both the participant A side and the participant B side (step S9).

Figure 6:
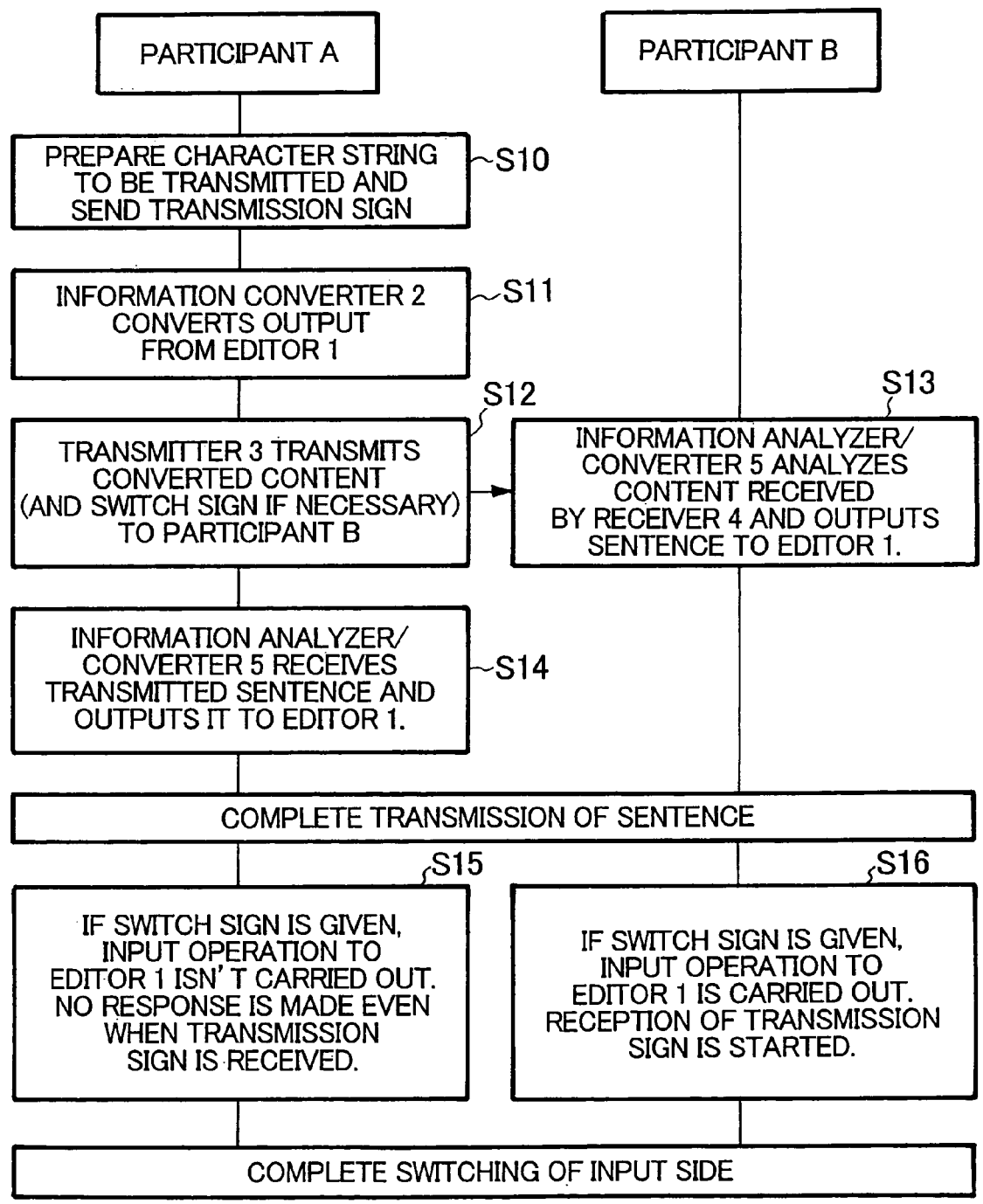
FIG. 6 is a flow diagram showing an operation of an embodiment of the present invention.

Continuing now with reference to FIGS. 1 and 6, a character string is then prepared, and the character string and a transmission sign are inputted on the input area of the editor 1-A by the input device as the key board (step S10). The information converter 2-A reads the content in the input area in the editor 1 (step S11), converts the content and sends the converted content to the transmitter 3-A.

The transmitter 3-A transmits the converted content to participant B. If a switch sign is included in the content read by the information converter 2-A, the switch sign is also transmitted to the participant B (step S12).

The receiver 4-B receives the content from participant A, and the information analyzer/converter 5-B analyzes the content and outputs a sentence to the output area in the editor 1-B (step S13).

In participant A, the transmitted sentence is sent to the information analyzer/converter 5-A. The information analyzer/converter 5-A outputs the sentence to the output area in the editor 1-A (step S14).

In the operation described above, positions of the communication participants cannot be switched if the participant A doesn't give a switch sign.

In participant A, when the switch sign is inputted to the information converter 2-A, after operation of the step 14, the information analyzer/converter 5-A stops inputs from the input device of participant A side from being reflected on the input area in the editor 1-A. Further, if the editor 1-A receives a transmission sign, the editor 1-A makes no response (step 15).

In participant B, when the receiver 4-B receives the switch sign, after operation of the step 13, the information analyzer/converter 5-B reflects inputs from the input device of participant B side, on the input area in the editor 1-B. Further, if the editor 1-B receives a transmission sign, the editor 1-B makes response (step 16).

As a switch sign, any of the following operations (1) to (6) can be used in place of pressing a return key. Suppose that the information converter 2 recognize every one of these operations as control information.

(1) A key input which is preset except the return key: for example, "space key" or a "combination of a system key and another key"

(2) Clicking a switch button which is preset in the present system (3) Detecting a specific preset character string while character strings to be transmitted are read from the editor 1 by the information converter 2: For example, "." or "over and out"

(4) Elapse of a time period after participants' positions are switched where the time period is preset by a timer function given to the information converter 2

(5) No input to an editor in the time period that is preset by a timer function given to the information converter 2

(6) A preset input from an external input device: For example, an audio input from a microphone or a target change in a camera input The information converter 2 may have a function to encrypt information by use of a presently existing encryption technique before transmitting the information to the transmitter 3. The information analyzer/converter 5 may have a function to send received information to the editor 1 after decoding the received information. The encryption technique includes a compression technique.

If a function to encrypt data is provided in the embodiment, information can be protected during a chat.

Figure 8:
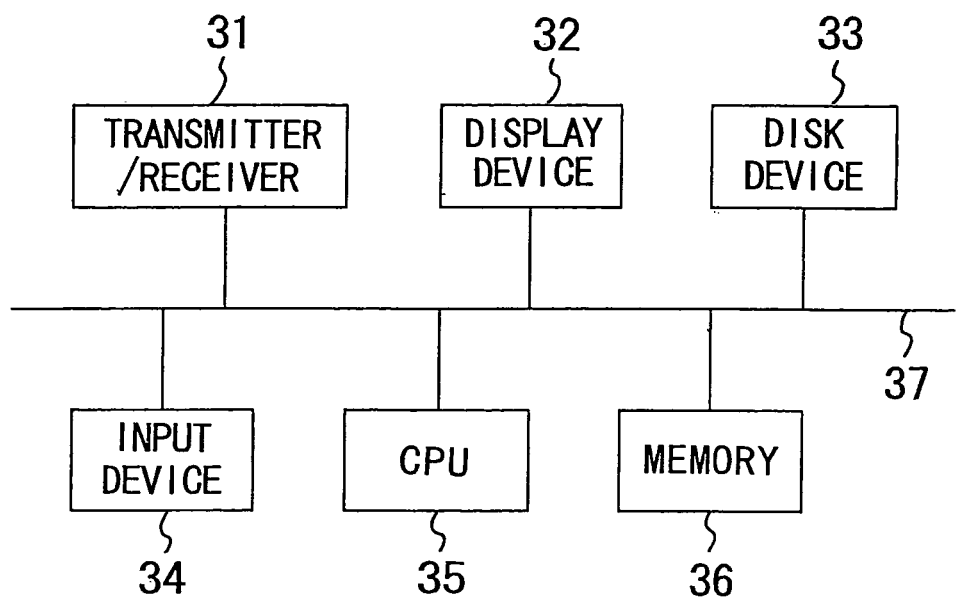
FIG. 8 is a block diagram showing a personal computer as a chat apparatus.

The chat apparatus 7 may be composed of a personal computer as shown in FIG. 8 and software running on the personal computer. The personal computer comprises Central Processing Unit (CPU) 35, and disk device 33 as a hard disk device which retains, for example, programs that the flowchart of the participant A or B shown in FIGS. 5 and 6 is described, memory 36 as a random access memory (RAM) which retains data for information processing, input device 34 as key board, display device 32 and transmitter/receiver 31. The transmitter/receiver 31 corresponds to the transmitter 3 and the receiver 4. The display device 32 and a part of the programs correspond to the editor 1. The information converter 2 and the information analyzer/converter 5 correspond to a part of the programs, that is, the functions of the information converter 2 and the information analyzer/converter 5 are realized by executing the programs.

Second Embodiment

The second embodiment has almost the same structure as the first embodiment. However, the information converter 2 and the information analyzer/converter 5 transmit/receive coding information to/from the communicating participant (partner) at the time of starting a chat or at arbitrary timing during a chat, to share the coding information between the communicating partners. The coding information includes sentence or words to be coded and a correspondence table of codes thereof.

In the same coding, words arbitrarily set by the communication participant A or B are set, as targets to be coded, in the information converter 2-A or 2-B. Then, the information converter 2-A or 2-B is capable of coding character strings based on coding information shared between the communication participants.

FIG. 7 is a diagram showing a sample of the correspondence table of codes. For example, codes "*", "#", "+" and "!" correspond to "I am very glad to exchange mail with you", "I am very glad to hear from you soon", "Thank you for your mail" and "Have a nice day", respectively.

Further, the information converter 2-A or 2-B may convert a first character string to a second character string shorter than the first character string. For example, the information converter 2-A or 2-B converts name character string "YUCHIRO SAITO" to character string "name 1" shorter than the name character string "YUCHIRO SAITO".

Third Embodiment

As shown in FIG. 2, sentence analyzer 6 is added to the configuration shown in FIG. 1. The sentence analyzer 6 has a function to receive a content read by the information converter 2, decompose the content into words depending on a part of speech, stock expressions, and the like, calculate occurrence frequency of each word, and update the coding information used by the information converter 2 and the information analyzer/converter 5.

The sentence analyzer 6 analyzes the content read by the information converter 2 in accordance with a predetermined method, and calculates occurrence frequency for every decomposed unit word.

The sentence analyzer 6 updates occurrence frequency of each word during a chat. Further, the sentence analyzer 6 adds to the coding information such a word that occurs at particular frequency or more and has a length which is assumed to contribute to reduction in data amount. Then, the analyzer 6 gives a notification to the information converter 2. The information converter 2 shares the coding information thus updated between the communication participants.

As the analysis method adopted in the sentence analyzer 6, it is possible to use a presently existing analysis technique. In addition, the sentence analyzer 6 may have a function to deal with a series of plural words as a unit word, for example, when a particular combination of words occurs very frequently.

Fourth Embodiment

[Description of the Structure]

Figure 4:
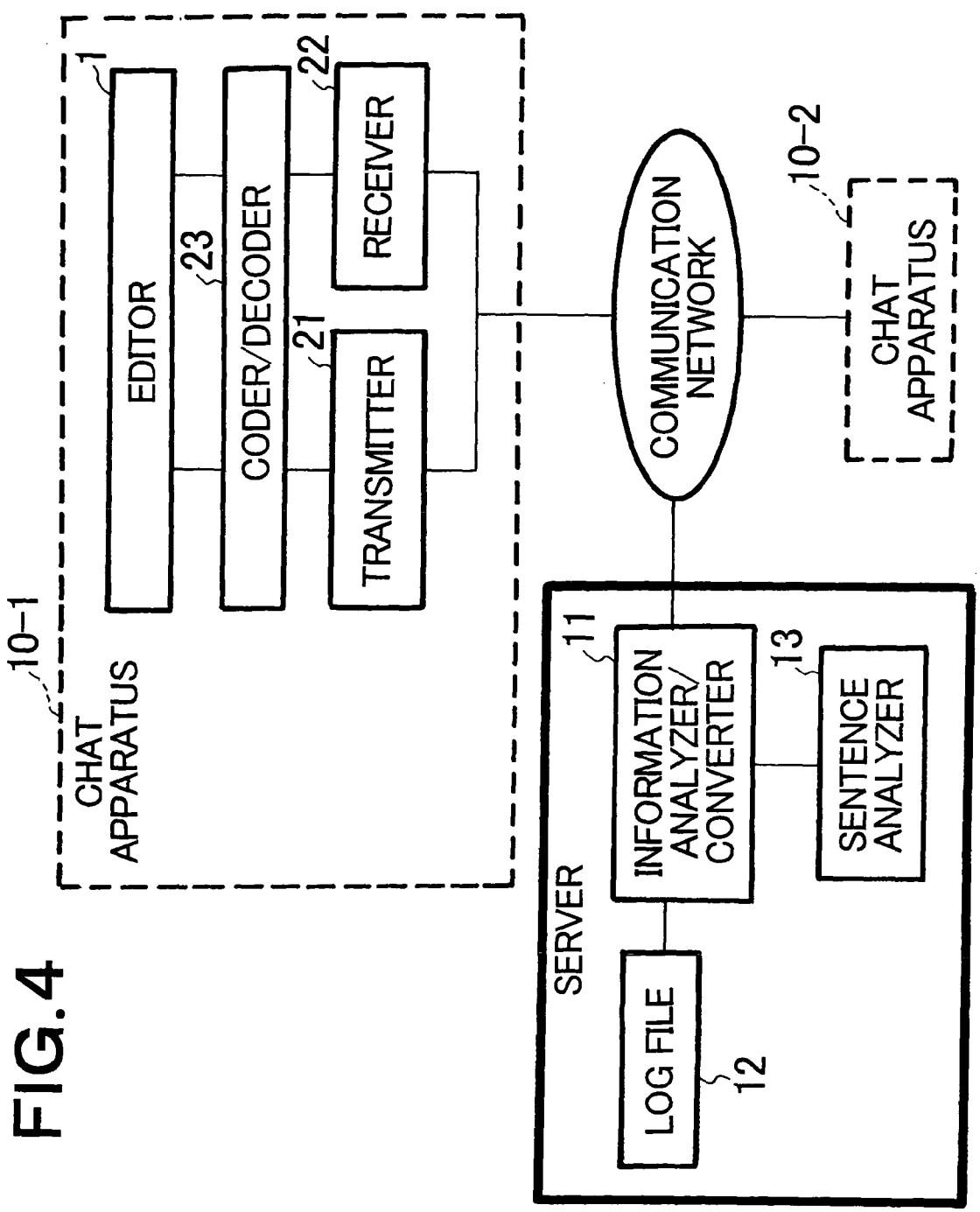
FIG. 4 is a block diagram showing a configuration of an embodiment of the present invention.

FIGS. 3 and 4 are block diagrams which show configurations of the present embodiment.

The fourth embodiment is not based on a one-to-one communication scheme like in the foregoing embodiments up to the third embodiment but relates to a chat according to a server management scheme.

Chat participants access to a server, and a chat support system is mounted on the server.

In the configuration shown in FIG. 3, each of chat devices 10-A and 10-B has an editor 1, transmitter 21, and receiver 22 in which the editor 1 corresponds to that shown in FIG. 1.

An input from an input device, such as a key board, is inputted directly to an input area in the editor 1. The transmitter 21 has a function to transmit a sentence of the input only.

The receiver 22 outputs a received sentence directly to an output area in the editor 1.

Information analyzer/converter 11 on the server performs operations corresponding to those of the information converter 2 and the information analyzer/converter 5. The information analyzer/converter 11 has a function to analyze and convert a sentence like in the one-to-one embodiments, and also has a function to add a sentence to log file 12. The information analyzer/converter ii may correspond to a part of the programs and storage portion, that is, the functions of the information analyzer/converter 11 may be realized by executing the programs.

In addition, the information analyzer/converter 11 stores communication address information concerning each of chat participants, and information concerning currently communicating partners and can switch a receiving-target partner.

Also, the information analyzer/converter 11 has a function to transmit all or specified part of the contents of the log file 12 to all the chat participants.

In the configuration shown in FIG. 4, the chat device 10 includes coder/decoder 23 which has the same coding function and decoding function as the information converter 2 and the information analyzer/converter 5 respectively have, as described in the first embodiment.

The server has a sentence analyzer 13 which has the same function as the sentence analyzer 6 in FIG. 2.

[Description of the Operation]

The present embodiment operates almost in the same manner as the first to third embodiments. However, the information analyzer/converter 11 on the server has the function to manage switching of the inputting partner.

The information analyzer/converter 11 reads a sentence transmitted from a chat participant who is taking a turn to input a sentence and searches for a switch sign and the like. Alternatively, the information analyzer/converter 11 may change the sentence in some cases.

Thereafter, the information analyzer/converter 11 adds to the log file 12 the sentence, and transmits to all the chat participants the added sentence.

In case of the configuration shown in FIG. 4, the sentence analyzer 13 operates like the sentence analyzer 6 in the third embodiment, with respect to the sentence read by the information analyzer/converter 11.

The sentence analyzer 13 links frequently occurring words (character strings) and sentences to codes, for example as shown in FIG. 7, and transmits coding information thereof to each chat participant.

This information is received by the coder/decoder 23 in each chat device. From the next time, a sentence is transmitted after coding, and a received sentence is outputted to the editor 1 after decoding.

Upon reception of a notified switch sign from a communication partner A by the server, the information analyzer/converter 11 switches the receiving-target partner to a next communication partner B. Then, the information analyzer/converter 11 ignores any more sentences from the communication partner A. On the other side, the information analyzer/converter 11 receives a sentence from the communication partner B and adds the sentence to the log file 12. Thus, only the communication partner B can then transmit a sentence.

In the present embodiment, communication and switch control are reliably performed at high speed with use of a server applicable to a network which can communicate further large volume of data.

Fifth Embodiment

[Description of the Structure]

In the fifth embodiment, the same unit-configuration as employed in any of the first to fourth embodiments is applied not to communication between two partners but to communication among plural (three or more) partners.

In the fifth embodiment, the information analyzer/converter 11 of the present embodiment has a function to identify and communicate properly with individuals of communication plural participants.

The information analyzer/converter 11 also has a function to store the input order of chat participants and perform switching in accordance with the input order.

[Description of the Operation]

The fifth embodiment operates almost in the same manner as any of the first to fourth embodiments. However, in order to start a chat, all of the participants who are in communication need to be prepared.

While a participant is inputting a sentence to the participant's own editor 1, the editors 1 of all the other participants than the participant who is inputting cannot receive any input operation.

When a currently inputting participant gives a sign to switch, the information converter 2 or the information analyzer/converter 11 then allows a next participant in the stored input order among all the participants to start inputting.

In the present embodiment, it is possible to provide a chat which plural participants can join.

Sixth Embodiment

[Description of the Structure]

The sixth embodiment has almost the same configuration as the fifth embodiment. However, the transmitter 3 and receiver 4 or the transmitter 21 and receiver 22 in the chat device 10-1 or 10-2 are equipped with a function to re-receive a connection even during a chat.

[Description of the Operation]

The sixth embodiment operates almost in the same manner as any of the forgoing first to fifth embodiments. However, when a new participant makes a connection to a chatting device, information concerning this connection is notified to all communicating participants, and the new connection is thereby added.

In this case, the new participant may be requested to input a password or the like.

If the new participant connects, a new connection is added to transmission partners of the transmitter 3, and the information converter 2 is let send coding information and encryption information to the address of the new connection.

Past messages remaining in the contents of the editor 1 are sent only to the address of the new connection. At this time, past messages may be limited in volume of communication, for example, limited to a particular data size or time period.

The new participant is registered at the lowest rank in the input order stored in the information converter 2 or information analyzer/converter 11 of each participant. The participation of the new participant is thereby completed.

If a currently connecting participant transmits a resignation from a chat, the connection thereof is deleted from the transmission partners of the transmitter 3 or information analyzer/converter 11 and from receiving-target partners of the receiver 4.

If the resigning participant is currently in an inputting state, a sign to switch the inputting participant is notified. This participant is deleted from the input order stored in the information converter 2 or information analyzer/converter 11 of each participant. Resignation is thereby completed.

In the present embodiment, it is possible to provide a chat which participants can freely join and resign from.

Seventh Embodiment

[Description of the Structure]

The information analyzer/converter 11 has a function to switch a real-time chat and a one-after-the other chat (catch type chat).

[Description of the Operation]

Upon a sign from a participant, the information analyzer/converter 11 switches to a state to receive inputs from all chat participants at all times. This state can be switched back to an original state to receive an input from only one participant.

However, exclusive control is employed in the communication between the information analyzer/converter 11 and the log file 12 so that any other sentence might not be added while a sentence is being added to the log file 12.

In each of the foregoing embodiments, a personal computer may be used as a chat device. Further, an ordinary telephone, PDA, cellular phone, or the like may be employed as a chat device.

What is claimed is:

1. A real-time chat apparatus used in a chat system which provides conversation by transmitting and receiving information among a plurality of chat apparatuses, comprising:
    an information converter which detects an inputted first specific character string, converts the inputted first specific character string to a character string shorter than the first specific character string or to a code, and outputs first information including the character string or code and first control information added when a statement ends, the first control information indicating switching of a chat;
    a transmitter which transmits the first information and first control information to a partner of the chat;
    a receiver which receives, from the partner of the chat, second information including a character string or code and second control information added when a statement ends, the character string or code being produced by converting a second specific character string, the character string being shorter than the second specific character string, and the second control information indicating switching of a chat; and an information analyzing/operating portion which stops input of a subsequent character string when the information converter outputs the first control information, analyzes the received second information and converts the character string or code to the second specific character string, and allows input of the subsequent character string when the second control information is included in the second information.

2. The chat apparatus according to claim 1, wherein coding information constituted by a table is transmitted/received to/from the partner to conduct the chat, the table being a table on which the first and second specific character strings as targets to be subject to coding are respectively linked to the character strings or the codes.

3. The chat apparatus according to claim 2, further comprising a sentence analyzer which calculates occurrence frequency of each of inputted character strings, determines the first and second specific character strings based on the occurrence frequency, and updates the coding information used in said information converter and information analyzing/operating portion.

4. The chat apparatus according to claim 1, wherein said transmitter and receiver receive connection from other chat apparatus even during a chat.

5. A server for a real-time chat system comprising:
an information analyzing/operating portion which receives information transmitted from a chat terminal, analyzes the received information, ignores information later transmitted from the chat terminal when control information is included and receives information transmitted from an other chat terminal, the control information indicating ending of a statement;
a recording portion which records a character string included in information received by said information analyzing/operating portion; wherein said information analyzing/operating portion transmits the character string recorded on said recording portion to a chat terminal other than said switched other chat terminal; and
a sentence analyzer which calculates occurrence frequency of each of character strings included in the received information and determines specific character strings based on the occurrence frequency, each of the specific character strings being converted to a converted character string shorter than the specific character string or to a code,
wherein said information analyzing/operating portion transmits the character string recorded on said recording portion to a chat terminal other than the other chat terminal, and transmits coding information including a corresponding table between the specific character strings and the converted character string or code to a chat terminal to carry out a chat.

6. The server according to claim 5, wherein said information analyzing/operating portion stores input order of chat terminals, and receives information in the input order when the control information indicating ending of a statement is received.

7. The server according to claim 5, wherein said information analyzing/operating portion is capable of switching between a state of receiving inputs from the chat terminals of all the chat participants and another state of receiving an input from only one of the chat participants, and employ exclusive control when communicating with said recording portion so that when the received information is added to a log file connected to said information analyzing/operating portion, other information is not added to the log file.

8. A real-time chat method for a chat system which provides conversation by transmitting and receiving information among a plurality of chat terminals, the method comprising the steps of:
receiving information transmitted from a chat terminal;
analyzing the received information, ignoring information later transmitted from the chat terminal when control information is included, and receiving information transmitted from an other chat terminal, the control information indicating ending of a statement;
recording a character string included in the received information;
calculating occurrence frequency of each of character strings included in the received information, determining specific character strings based on the occurrence frequency, each of the specific character strings being converted to a converted character string shorter than the specific character string or to a code, and transmitting coding information including a corresponding table between the specific character strings and the converted character string or code to a chat terminal to carry out a chat; and
transmitting the recorded character string to a chat terminal other than said other chat terminal.

9. A computer-readable non-transitory storage medium storing a program embodied therein for instructing a server connected to a chat terminal through a network to perform a real-time chat method comprising the steps of:
receiving information transmitted from a chat terminal;
analyzing the received information, ignoring information later transmitted from the chat terminal when control information is included, and receiving information transmitted from an other chat terminal, the control information indicating ending of a statement;
recording a character string included in the received information;
calculating occurrence frequency of each of character strings included in the received information, determining specific character strings based on the occurrence frequency, each of the specific character strings being converted to a converted character string shorter than the specific character string or to a code, and transmitting coding information including a corresponding table between the specific character stings and the converted character string or code to a chat terminal to carry out a chat; and
transmitting the recorded character string to a chat terminal other than said other chat terminal.

* * * * *